Figure 1:
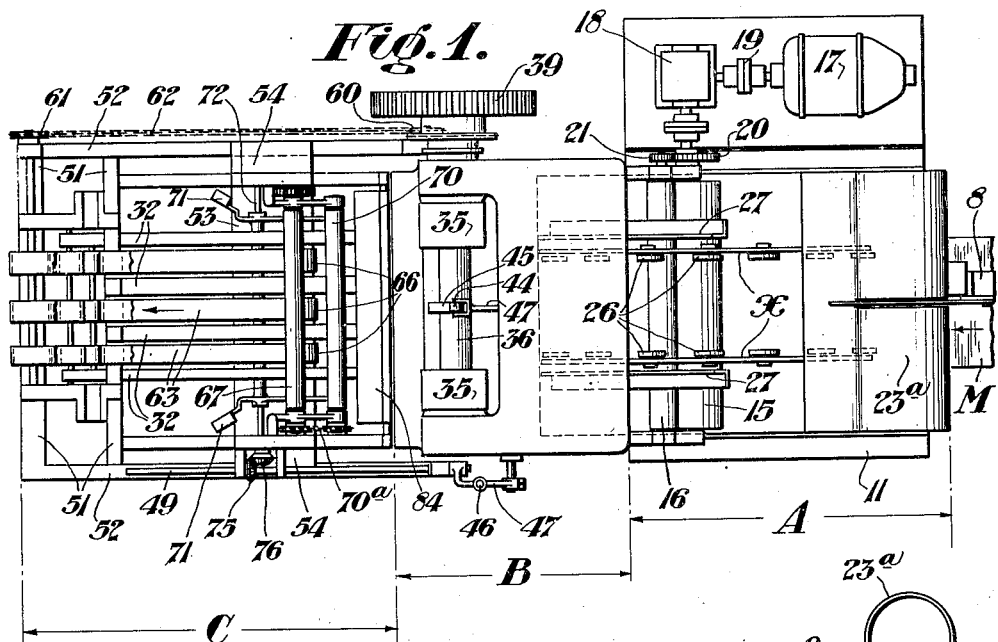

Dec. 24, 1935.  C. E. MOORE  2,025,418
SHEAR
Filed Jan. 23, 1934   6 Sheets-Sheet 1

Inventor:
CARL E. MOORE,
by Usina & Rauber
his Attorneys

Dec. 24, 1935. C. E. MOORE 2,025,418
SHEAR
Filed Jan. 23, 1934 6 Sheets-Sheet 3
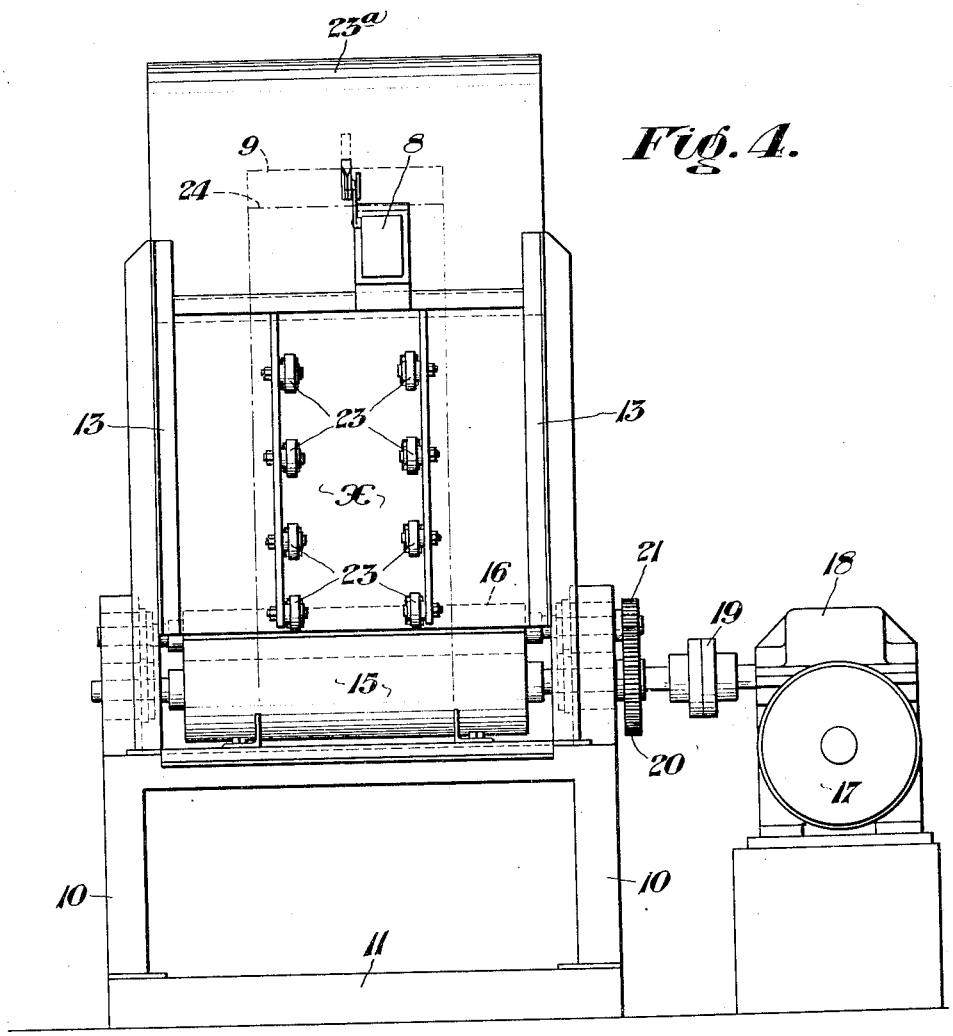
Fig. 4.
Fig. 5.
Inventor:
CARL E. MOORE,
by: 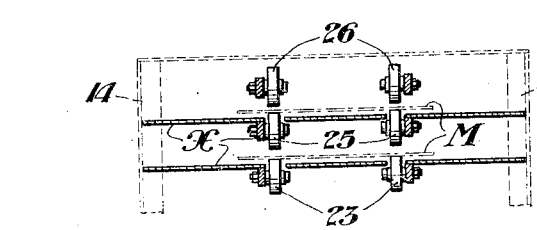
his Attorneys.

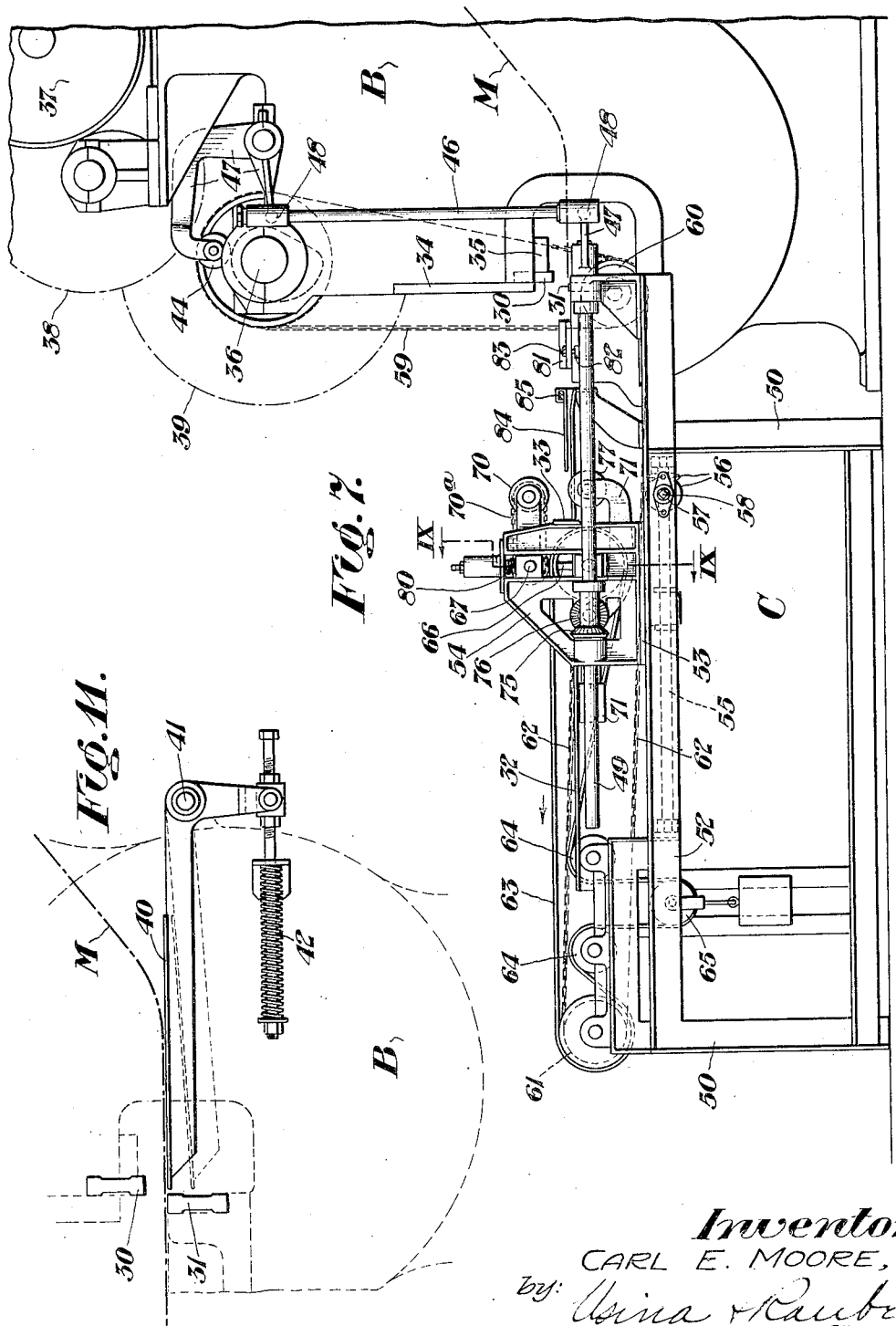

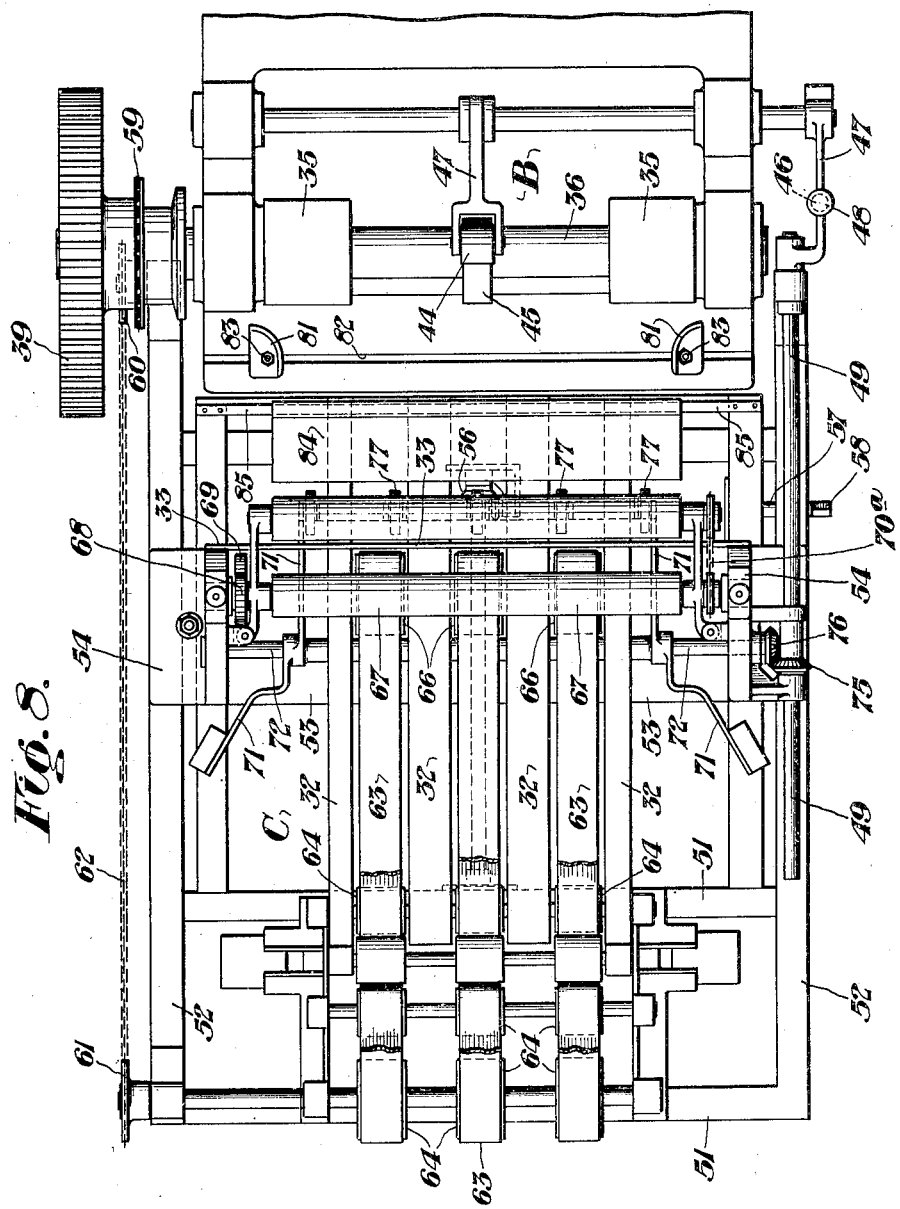

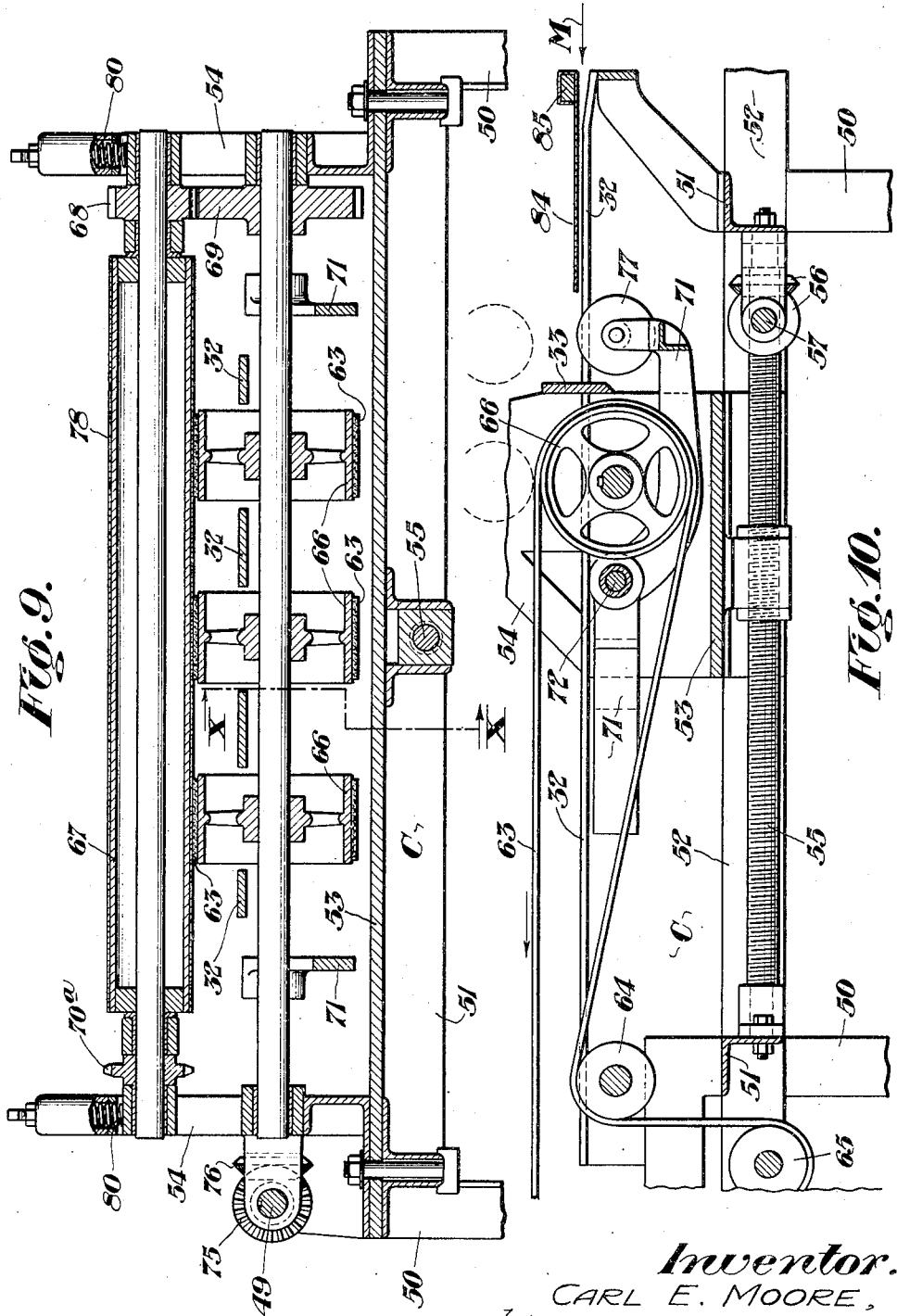

Patented Dec. 24, 1935

2,025,418

UNITED STATES PATENT OFFICE 2,025,418

SHEAR

Carl E. Moore, Gary, Ind., assignor to American Sheet & Tin Plate Company, a corporation of New Jersey Application January 23, 1934, Serial No. 707,979

4 Claims. (Cl. 164—49)

This invention relates to shears, and more particularly to a cutting up shear for cutting relatively long, thin metal strips into short equal lengths, and has for one of its objects the provision of such a shear which would be automatic in operation and would operate at materially higher speeds than prior art shears of this general class.

Another object is to provide a novel form of strip feeding mechanism as a part of the shear construction which will provide a more positive speed of the strip through the shear than that generally provided.

In the manufacture of thin gage strip metal, the strip is usually cut into short lengths either during or at the end of the mill processing, and it is for this purpose that the shear of this application is admirably adapted.

Figure 2:
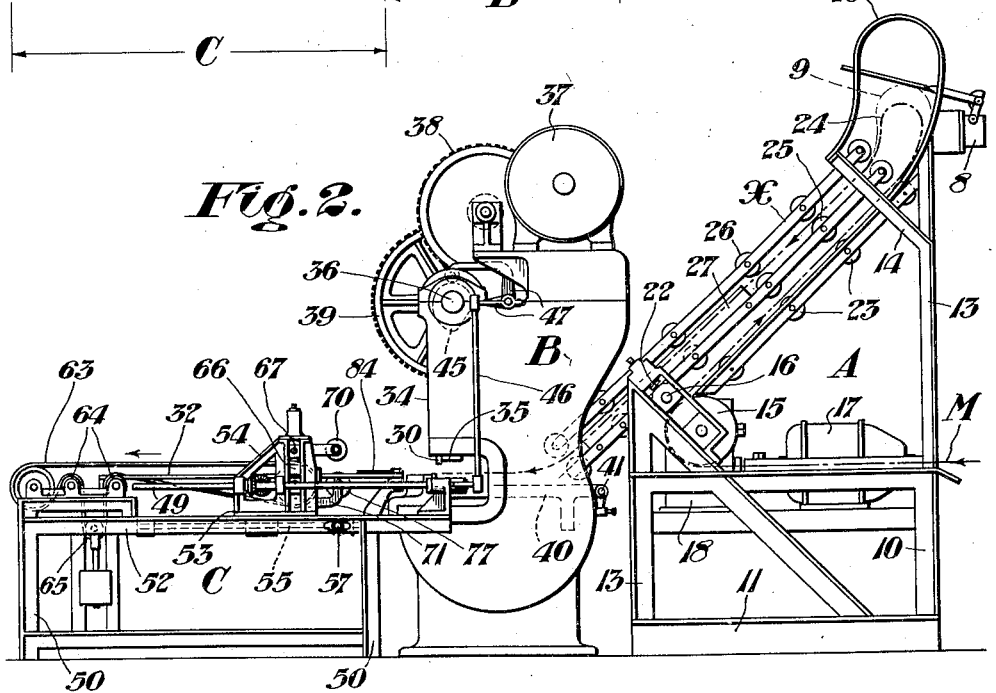
Figure 3:
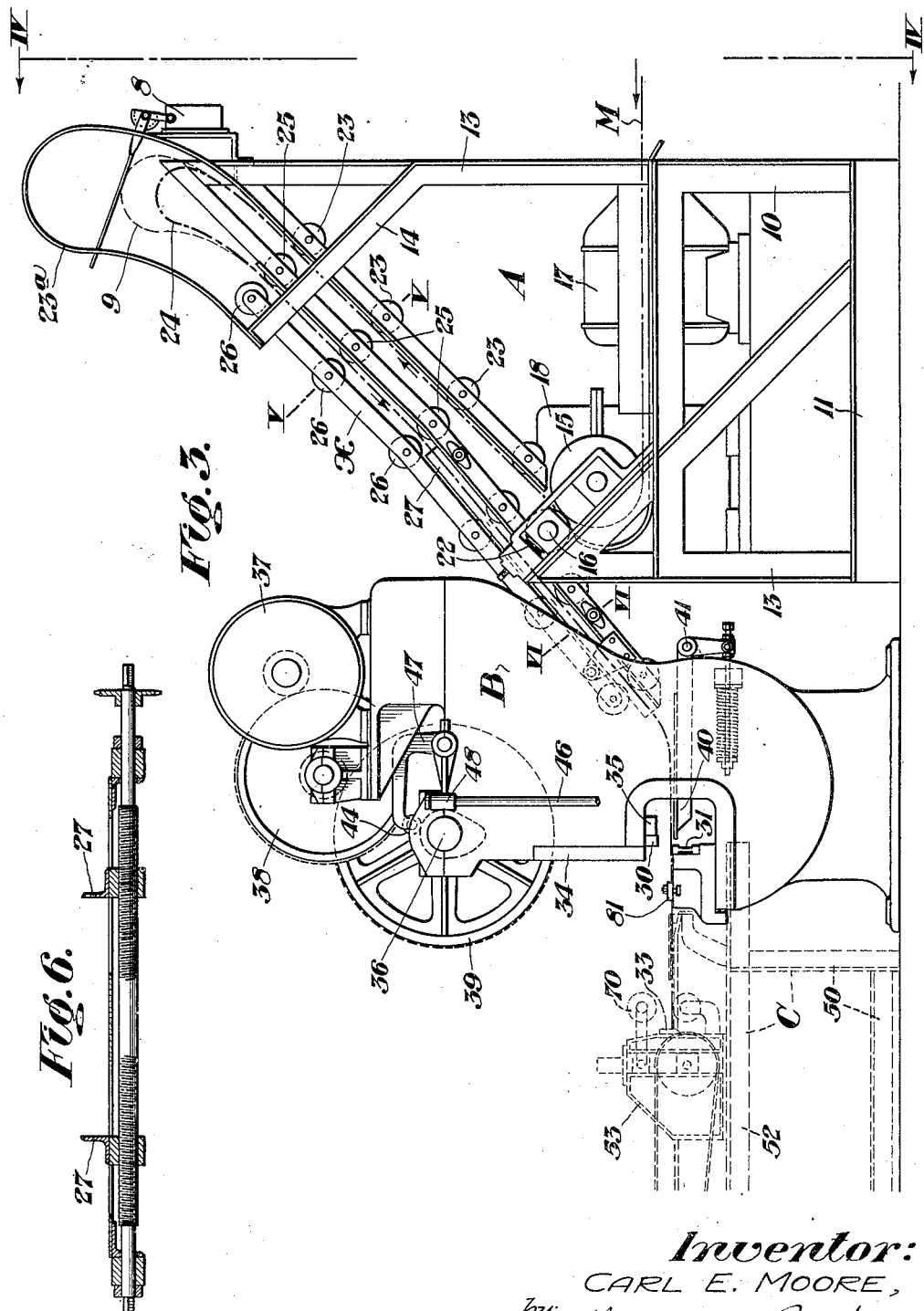

In the drawings:

Figure 1 is a general plan of a shearing apparatus constructed in accordance with this invention; Figure 2 is a side elevation thereof; Figure 3 is an enlarged side elevation; Figure 4 is a view on the line IV—IV of Figure 3; Figure 5 is a view on the line V—V of Figure 3; Figure 6 is an enlarged detail view on the line VI—VI of Figure 3; Figure 7 is an enlarged elevation of the shear adjacent the shear blades; Figure 8 is an enlarged plan of part of the apparatus; Figure 9 is an enlarged sectional view on the line IX—IX of Figure 7;

Figure 10 is an enlarged sectional view on the line X—X of Figure 9; and, Figure 11 is an enlarged elevation of a portion of the shear immediately adjacent the shear blades.

Referring more particularly to the drawings, the letter A indicates that portion of the apparatus referred to generally as the feed-in conveyor; the letter B designates the shear proper, while the letter C designates that portion of the apparatus referred to generally as the exit or feed-out conveyor.

The feed-in conveyor mechanism A is constructed and arranged to feed the strip designated by the letter M to and through the shear by gravity, and comprises upright frame members 10 rigidly secured to a base 11, and mounted between the frames 10 is a double decked conveyor table X mounted in an incline position of about 45 degrees. The double deck conveying table X is supported by conventional frame members 13 and 14. As heretofore stated, the conveyor table X is adapted to feed the strip material to and through the shear by gravity and this gravity feed is accomplished by first raising or moving the strip metal to a predetermined height; that is, over the top or upper end of the conveyor X by means of driven pinch rolls 15 and 16.

The rolls 15 and 16 are suitably driven as by a motor 17 through a gear reducer 18, flexible coupling 19 and gear 20. The gear 20 in turn meshes with a gear 21 which drives the roll 16 at the same peripheral speed as the roll 15 to insure positive driving contact at all times between rolls 15 and 16 and the metal strip M; the small roll 16 is backed up by springs 22. The incoming strip, due to the feed of the pinch rolls 15 and 16, is forced to move upwardly along the lower deck of the conveyor over idler rollers 23, and as the strip reaches the upper end of the conveyor X, it is forced to reverse its direction of travel by a looping guide 23ª forming a loop 24. As the metal passes the loop 24 it is guided on to the upper deck of the conveyor X and travels by gravity down the incline conveyor between idler rollers 25 and 26.

The loop 24 of the strip varies in size, depending on the rate of shearing and the rate of feed of the strip by the pinch rollers 15 and 16. It will be understood that the rollers 15 and 16 are constantly operating and, therefore, cause a steady or constant feed of the strip M upwardly along the conveyor A. The loop 24 is preferably maintained in about the position as shown in the drawings, but should the constant or steady feed of strip upwardly along the conveyor A exceed the output through the shear, the loop 24 will expand, as indicated in dotted lines at 9. This expansion of the loop causes the metal of the loop to engage the operating arm of a limit switch 8 which in turn controls the speed of the motor 17 and in turn controls the speed of operation of the pinch rollers 15 and 16. By varying the speed of the pinch rollers 15 and 16, the feed of the metal upwardly along the conveyor will be varied so as to control the size of the loop 24. It follows that as the loop decreases beyond a fixed or predetermined amount, the position of the limit switch 8 changes so as to speed up the motor 17; consequently the speed of the pinch rollers 15 and 16 thereby increases the feed of metal to the loop and increases the size of the loop.

Side guides 27 on either side of the upper idler conveyor rolls 26 keep the metal strip M in a straight line feed to the shear and materially aid in feeding the strip squarely toward a stop member 33 on the exit side of the shear. The metal, upon reaching the shear B, passes between the shear blades and engages the stop member 33, and the shear blades operate to cut the portion of the metal to the shear blades and the stop 33. The shear B, while of generally standard design, is modified somewhat for its operation in this combination.

The shear has the usual upper reciprocatory shear blade 30 and lower stationary shear blade 31, and as the strip which is passed between the shear blades 30 and 31 engages the stationary stop 33, the upper shear blade 30 descends and cuts off the short length of strip between the blades and the stop 33. This cutting action is produced in the conventional manner by the upper shear blade 30 moving up and down between side guides 34. The upper shear blade 30 is attached to an arm 35, rotating at its upper end around a shaft 36, which shaft is in turn operated by a motor 37 through driving gears 38 and 39.

A supporting table 40 is provided on the feed-in side of the shear and is hinged at one end, as at 41, and yieldably held against downward movement by an adjustable spring 42. As the strip passes by gravity from the conveyor A it moves over the table 40 and is guided between the shear blades 30 and 31 until it comes to rest against the stop 33. The action of the shear is so timed that as soon as a forward movement of the strip is arrested by the stop 33, the upper shear blade 30 descends to cut the strip. During the descending or cutting stroke of the upper shear blade 30, the blade engages the portion of the strip on the table 40 and holds the end of the strip against the table while the table yields or moves downwardly with the stroke of the blade 30. As soon as the shear blade 30 starts on its upward movement or stroke the spring 42 moves the table 40 upwardly so that it follows the upward stroke of the shear blade 30 until it again assumes its normal horizontal position. As the table 40 reaches the normal horizontal position, the upper blade 30 will have cleared the lower blade 31 and the strip will immediately be projected by gravity assisted by the inherent resiliency on the strip in the loop 24 through the shear until its forward end again engages the stop 33 in readiness for another cut.

The feed-out or exit conveyor C comprises primarily a table supported by members 50, and provided with guides 32 adjacent the shear proper, which guides are slightly below the level of the fixed shear blade 31. Transverse members 51 hold longitudinal brace members 52 in rigid connection with supports 50 so that a moving cross-head 53 may be moved longitudinally on the table toward or away from the shear proper and yet in perfect alignment therewith.

The moving cross-head 53 is made up of rigid end supports 54 which are adapted to have a sliding engagement with the members 52. The cross-head 53 is adapted to be moved toward and away from the shear by means of a central screw drive 55 rotated through gears 56 and a shaft 57, positioned at right angles thereto and readily operated by a handle or crank positioned on the squared end 58.

The cross-head 53 carries three driven rolls 66, 67 and 70 which are operated by a chain drive 59 through the shaft 36 on the shear. The chain 59 drives a sprocket 60 which in turn drives a sprocket 61 by means of a chain 62. The sprocket 61 in turn drives an endless belt 63. The endless belt 63 passes over guide rolls 64 and a counterbalanced take-up roll 65, which is provided for the purpose of permitting the extension and retraction of the endless belt when the cross-head 53 is moved toward or away from the shear. The endless belt passes over the large bottom roll 66 positioned in the cross-head 53 and forming with the roll 67 a pinch mechanism for feeding the short, cut lengths of strip on to the belt 63. The roll 67 is adapted to be driven by means of a gear 68 meshing with a gear 69 carried by the lower roll 66.

The roll 70 is mounted in brackets, extending from the cross-head 53, and is adapted to be operated by a chain 70ª passing over sprockets carried by the roll 67 and the roll 70.

The roll 70 forms a part of a novel pinch roll assembly for moving the cut off pieces of strip forwardly into the bite between the rolls 67 and the portion of the endless belt 63 passing over the roll 66. This pinch roll assembly includes a roll 77 normally positioned below the strip being sheared and being adapted to be elevated after the strip is sheared so as to elevate the cut off portion of the strip into engagement with the roll 70. The roll 77 is journaled in rocking arms 71 which are so positioned as to normally position the roll 77 below the line of feed of the strip passing through the shear toward the stop 33. An oscillating shaft 49 is connected by gears 75 and 76 to the shaft 72, on which the arms 71 are mounted, and the operation of the shaft 49 is such that it will cause a rocking or alternately raising and lowering of the floating rollers 77 from a position below the guides 32 and the position to pinch the cut off strip between the rollers 77 and 70. In order to prevent scratching or marring of the metal, the pinch rolls may be covered with flannel or other non-abrasive material, such as indicated at 78 for the roll 67. The top roll 67 is provided with backing up springs 80 in order to insure a positive grip on the material.

In order to operate the shaft 49 of the feed-out or exit conveyor C, power is taken from the shear motor 37 by means of an idling roller 44 which runs in an eccentric cam 45 positioned on the shear shaft 36. This eccentric movement of the roller 44 is transmitted as vertical motion to a connecting link 46 through levers 47 and connections 48. The lower end of the vertical connecting link 46 transmits to the horizontal shaft 49 the oscillating motion which is communicated through gears 75 and 76 to the arms 71 for raising and lowering the roller 77.

In order to guide and hold the strip metal flat between the stop 33 of the conveyor and the blades of the shear, suitable side guides 81 are positioned on either side of the conveyor table supports 32. The guides 81 are adjustable by means of slots 82 and set screws 83 for various widths of strip material. An additional means for keeping the end of the strip to be cut in a flat position and preventing buckling is shown as consisting of a wide sheet member 84 sprung around a transverse bar 85. The sheet 84 covers substantially the entire width of the feed-out conveyor and has a length such as to terminate slightly short of the roll 77. The sheet 84 is adapted to have sufficient spring to prevent the end portion of the strip from buckling when it engages the stop 33. The elimination of buckling is absolutely essential in order to prevent the cutting of various lengths of strip.

In operation, the long, thin strip metal M is fed from suitable reels (not shown) and is engaged between the pinch rollers 15 and 16. The rollers 15 and 16 which are constantly operating push or feed the strip M upwardly along the incline conveyor in the bottom deck thereof, and as the end of the strip reaches the upper end of the incline conveyor it will be reversed in movement by the guide 23 forming the loop 24. As previously described, the magnitude of this loop will be controlled by the limit switch 8 which in turn increases or decreases the speed of rotation of the pinch rolls 15 and 16, and consequently increases or decreases the speed of travel of the strip.

The strip, after it has passed the upper end of the conveyor and has formed the loop 24, descends or travels downwardly along the upper deck of the conveyor A by gravity. As the strip reaches the lower end of the conveyor A it will move across the table 40 between the shear blades 30 and 31 and along the guides 32 and come to a stop against the stationary stop member 33. As the movement of the forward end of the strip is arrested by the stop 33, it is in readiness to be cut, and the shear blade 30 is so timed that it will descend at this instant and cut the portion of the strip in advance of the shear blades from the main portion of the strip. During the cutting movement of the upper blade 30 of the shear, the support table 40 will be moved downward, as previously described, the uncut portion of the strip being held or pinched between the upper shear blade 30 and the table 40. The spring 42 will cause the yield table 40 to reverse its movement and follow the upper shear blade 30 in its upward movement until the table again comes to its normal position, at which time the uncut portion of the strip will be advanced by gravity and by the inherent resiliency of the strip in the loop 24 until its forward end again comes in contact with the stop 33, in which time the cycle of operation would be repeated. When the upper shear blade 30 has made its complete cutting stroke, the pinch roller 77 will be caused to rock upwardly, raising the forward end of the cut off portion of strip upwardly into contact with the revolving roll 70, and the cut portion of strip will be fed forwardly between the pinch roll 67 and the portion of the belt 63 supported by the roll 66, and the sheet will then be conveyed forwardly along the belt 63 to its discharge or forward end from which point the cut off portion of the strip will be discharged under suitable piling mechanism not shown.

The cross-head 53 which embraces the conveyor rollers 66, 67, 70 and 77 can be so positioned longitudinally of the conveyor unit C that various lengths of metal strip may be cut, since the stationary stop 33 is carried by the cross-head. The slack in the conveyor belt 63 is taken up by the floating counterweighted roller 65.

While I have shown and described one specific embodiment of my invention, I do not wish to be limited thereto since various modifications may be made without departing from the scope of my invention as defined in the appended claims.

I claim:

1. An automatic shearing apparatus for cutting strip metal into short lengths including in combination a shear, means for feeding the strip to and through said shear and means for conveying away the sheared short lengths of strip, said shear including a stationary lower shear blade and a vertically reciprocable upper shear blade, a strip supporting table on the feed-in side of said shear, said table being yieldable so as to move downwardly with said upper shear blade during the shearing operation, and means for returning said table and unsheared portion of strip to normal position on the upstroke of said upper shear blade.

2. An automatic shearing apparatus for cutting strip metal into short lengths including in combination a shear, means for feeding the strip to and through said shear, a stationary stop gage on the exit side of said shear for gaging the lengths of strip to be cut, a hold-down means for preventing buckling of the strip between said shear and said stop gage, and means for conveying the cut pieces of strip away from said shear.

3. An automatic shearing apparatus for cutting strip metal into short lengths including in combination a shear, means for feeding the strip to and through said shear, a stationary stop gage on the exit side of said shear for gaging the lengths of strip to be cut, and means for conveying the cut pieces of strip away from said shear, said means including an endless belt conveyor and means for elevating the cut pieces above said stop gage and feeding said pieces onto said belt conveyor.

4. An automatic shearing apparatus for cutting strip metal into short lengths including in combination a shear, means for feeding the strip to and through said shear, a stationary stop gage on the exit side of said shear for gaging the lengths of strip to be cut, and means for conveying the cut pieces of strip away from said shear, said means including an endless belt conveyor and at least one pair of pinch rollers, the lower one of said pinch roller being adapted to move vertically to elevate the cut pieces above said stop and into contact with the upper pinch roller to cause said pinch rollers to propel the cut piece forward onto said endless belt conveyor.

CARL E. MOORE.